(12) United States Patent
Chan (10) Patent No.: US 9,207,913 B2
(45) Date of Patent: Dec. 8, 2015

(54) API PUBLICATION ON A GATEWAY USING A DEVELOPER PORTAL

(71) Applicant: CA, Inc., Islandia, NY (US)

(72) Inventor: Vincent Chan, Burnaby (CA)

(73) Assignee: CA, Inc., New York, NY (US)

( * ) Notice: Subject to any disclaimer, the term of this patent is extended or adjusted under 35 U.S.C. 154(b) by 23 days.

(21) Appl. No.: 14/195,536

(22) Filed: Mar. 3, 2014

(65) Prior Publication Data
US 2015/0248276 A1 Sep. 3, 2015

(51) Int. Cl.
*G06F 9/44* (2006.01)
(52) U.S. Cl.
CPC ... *G06F 8/30* (2013.01); *G06F 8/70* (2013.01)
(58) Field of Classification Search
CPC ..................................... G06F 8/30; G06F 8/70
See application file for complete search history.

(56) References Cited

U.S. PATENT DOCUMENTS

| 8,510,762 | B1 * | 8/2013 | Gregorio et al. ............... 719/328 |
| 8,756,568 | B2 * | 6/2014 | Hale et al. ...................... 717/123 |
| 2008/0209451 | A1 | 8/2008 | Michels et al. |
| 2013/0269041 | A1 | 10/2013 | Hill et al. |
| 2014/0053126 | A1 * | 2/2014 | Watson et al. ................. 717/102 |
| 2014/0372986 | A1 * | 12/2014 | Levin et al. .................... 717/126 |

* cited by examiner

*Primary Examiner* — Charles E Anya
(74) *Attorney, Agent, or Firm* — Vierra Magen Marcus LLP (57) ABSTRACT

A protocol is provided for configuring and publishing an API on an API gateway using an API developer portal. An executable module is created on the API gateway that includes variables that control API runtime behaviors. A flag is included in the executable module indicating that the executable module may be published to the API developer portal. An API template is created on the API gateway that is linked to the flagged executable module, and that specifies the executable module variables that may be configured on the API developer portal. On the API developer portal, the API template is selected, the variables specified by the API template are configured, and the configured API template is saved and published as an API on the API gateway.

21 Claims, 9 Drawing Sheets

API PUBLICATION ON A GATEWAY USING A DEVELOPER PORTAL

BACKGROUND

The present disclosure relates to application program interface (API) management, and in particular, publishing an API on an API gateway using an API developer portal.

An API management system may include an API gateway and an API developer portal. An API gateway may be used to expose, secure and manage backend applications, infrastructure and/or network systems as published APIs. An API developer portal communicates with the API gateway, and may be used to provide access to and resources for the published APIs to internal and external developers. For example, internal and external developers may communicate with the API developer portal to access published APIs that the developers may use to build applications against, such as web and mobile applications.

An API gateway may be managed by one or more API administrators who, among other things, control and configure the APIs that are published on the API gateway. An API developer portal may be managed by one or more portal administrators who do not have access to the API gateway, and cannot configure or publish APIs on the API gateway. Instead, the portal administrator must ask the API administrator to configure and publish a new API on the API gateway.

BRIEF SUMMARY

According to one aspect of the present disclosure, a protocol is provided for configuring and publishing an API on an API gateway using an API developer portal. In an embodiment, an executable module is created on the API gateway that includes variables that control API runtime behaviors. A flag is included in the executable module indicating that the executable module may be published to the API developer portal. An API template is created on the API gateway that is linked to the flagged executable module, and that specifies the executable module variables that may be configured on the API developer portal. On the API developer portal, the API template is selected, the variables specified by the API template are configured, and the configured API template is saved and published as an API on the API gateway. Control over the particular executable modules that may be published to the API developer portal, and the variables of the executable module that may be configured at the API developer portal remain with the API gateway.

According to another aspect of the disclosure, a method is provided for use with a computing device for creating an API on a server. The method includes receiving a description of an executable module on the server, and receiving a description of a template on the server. The description of the executable module includes a variable and a flag having a predetermined value. The description of the template includes a selection of the executable module and a specification of the variable. The method further includes linking the executable module to the template on the server, communicating information about the template to the computing device, receiving a selection of the template on the computing device, receiving a configuration of the specified variable on the computing device, and saving the selected template and the configured variable as the API on the server.

According to another aspect of the disclosure, a system is provided that includes a first apparatus having a first processor, a second apparatus having a second processor, and a computer readable storage medium to store a first application having computer readable program code and a second application having computer readable program code. The first processor executes the computer readable program code of the first application to receive a description of an executable module on a server computing device, the description including a variable and a flag having a predetermined value, receive a description of a template on the server computing device, the description including a selection of the executable module and a specification of the variable, and link the executable module to the template on the server computing device. The second processor executes the computer readable program code of the second application to receive information about the template at a computing device, receive a selection of the template on the computing device, receive a configuration of the specified variable on the computing device, and save the selected template and the configured variable as an API on the server.

According to another aspect of the disclosure, a computer program product is provided that includes a computer readable storage medium having computer readable program code embodied therewith. The computer readable program code includes: (a) computer readable program code configured to receive a description of an executable module on a server, the description comprising a variable and a flag having a predetermined value; (b) computer readable program code configured to receive a description of a template on the server, the description comprising a selection of the executable module and a specification of the variable; (c) computer readable program code configured to link the executable module to the template on the server; (d) computer readable program code configured to communicate information about the template to a computing device; (e) computer readable program code configured to receive a selection of the template on the computing device; (f) computer readable program code configured to receive a configuration of the specified variable on the computing device; and (g) computer readable program code configured to save the selected template and the configured variable as an API on the server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
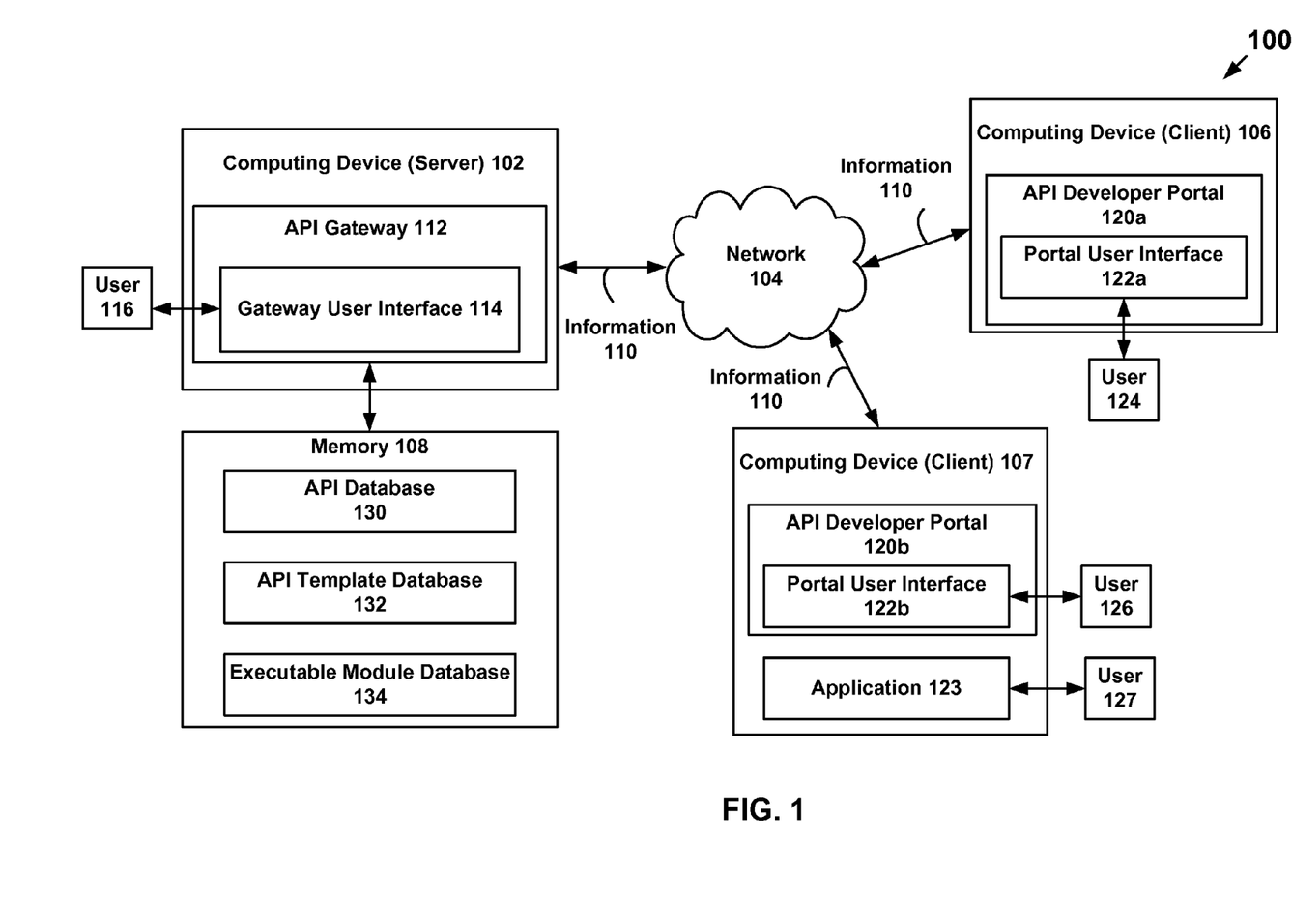
FIG. 1 illustrates a high-level block diagram of an apparatus or system comprising networked computing devices for publishing an API on an API gateway using an API developer portal according to an embodiment.

FIG. 1 is a high-level block diagram of a system 100 including networked computing devices that include an API gateway and an API developer portal. As described in more detail below, a user of the API developer portal may configure and publish an API on the API gateway using the API developer portal, without directly accessing the API gateway. In embodiments, an API may be a library that includes specifications for routines, data structures, object classes, and/or variables.

In an embodiment, system 100 includes a first computing device 102 that communicates via a network 104 with a second computing device 106 and a third computing device 107, and communicates with memory 108. First computing device 102 may be remotely located from second computing device 106 and third computing device 107. First computing device 102 may be external to second computing device 106 and/or third computing device 107, or alternatively one or more of first computing device 102, second computing device 106 and third computing device 107 may be the same computing device. Memory 108 may be included in or external to first computing device 102. Persons of ordinary skill in the art will understand that system 100 alternatively may include additional computing devices that communicate with one another via network 104. Persons of ordinary skill in the art will understand that first computing device 102 may be directly coupled to memory 108, or may communicate with memory 108 via network 104.

In an embodiment, first computing device 102 may be a server and second computing device 106 and third computing device 107 each may be a client of first computing device 102. For example, first computing device 102 may be a server providing information, such as information 110, to second computing device 106 and third computing device 107 that each acts as a client. First computing device 102 may be a computer server, a desktop computer, a laptop computer, a data center, or other similar computing device. Second computing device 106 and third computing device 107 each may be a desktop computer, a laptop computer, a mobile computing device such as a cell phone, laptop computer, notebook or tablet, or other similar computing device. In another embodiment, first computing device 102, second computing device 106 and third computing device 107 may be peers. In a peer-to-peer (P2P) embodiment, first computing device 102, second computing device 106 and third computing device 107 each may act as a client or a server of the other.

In an embodiment, network 104 may be the Internet, a Wide Area Network (WAN) or a Local Area Network (LAN), singly or in combination. In embodiments, first computing device 102 and second computing device 106 may use one or more protocols to transfer information, such as Transmission Control Protocol/Internet Protocol (TCP/IP). In embodiments, first computing device 102, second computing device 106 and third computing device 107 may be included in the same network or may be in separate networks. Information 110 may be transferred between first computing device 102, second computing device 106 and third computing device 107 by wire and/or wirelessly in network 104.

In an embodiment, first computing device 102 may include an application, such as an API gateway 112 that includes a gateway user interface 114. In an embodiment, a gateway user 116 (or multiple users in an embodiment), such as a gateway administrator or other user, may use gateway user interface 114 to create executable modules and API templates. In embodiments, API gateway 112 and gateway user interface 114 are computer program code.

In an embodiment, second computing device 106 may include an application, such as API developer portal 120a, having a portal user interface 122a. API developer portal 120a may be a web application running in a web browser, or may be any other similar application. In an embodiment, a portal user 124 (or multiple users in an embodiment), such as a portal administrator or other user, may use portal user interface 122a to configure and publish APIs on API gateway 112. In embodiments, API developer portal 120a and portal user interface 122a are computer program code.

In an embodiment, third computing device 107 may include an application, such as API developer portal 120b, having a portal user interface 122b. API developer portal 120b may be a web application running in a web browser, or may be any other similar application. In an embodiment, a portal user 126 (or multiple users in an embodiment), such as an application developer or other user, may use portal user interface 122b to discover, test, and access APIs on API gateway 112 for building applications, such as application 123 that uses one or more of the APIs on API gateway 112 to access resources on first computing device 102, such as information and/or services of first computing device 102. In an embodiment, a user, such as user 127, may use application 123, which uses one or more of the APIs on API gateway 112, to obtain a resource or service from first computing device 102. In embodiments, API developer portal 120b and portal user interface 122b are computer program code.

In an embodiment, API developer portal 120a may be the same as API developer portal 120b, and portal user interface 122a may be the same as portal user interface 122b, but the features and functions of API developer portal 120a and portal user interface 122a provided to user 124 may be different from the features and functions of API developer portal 120b and portal user interface 122b provided to user 126. For example, API developer portal 120a may permit user 124 to configure and publish an API on API gateway 112 using API developer portal 120a, whereas API developer portal 120b may not permit user 126 to perform such actions using API developer portal 120b.

In an embodiment, gateway user interface 114, portal user interface 122a and portal user interface 122b include natural language interfaces where a user may speak, touch or gesture to gateway user interface 114, portal user interface 122a and portal user interface 122b to provide input. Similarly, gateway user interface 114, portal user interface 122a and portal user interface 122b may output images, characters, speech and/or video as an output in an embodiment.

In an embodiment, memory 108 may include an API database 130, an API template database 132 and an executable module database 134. Memory 108 may be a single memory, or may include multiple memory devices. API database 130, API template database 132 and executable module database 132 may be separate databases, or may be a single database.

Figure 2:
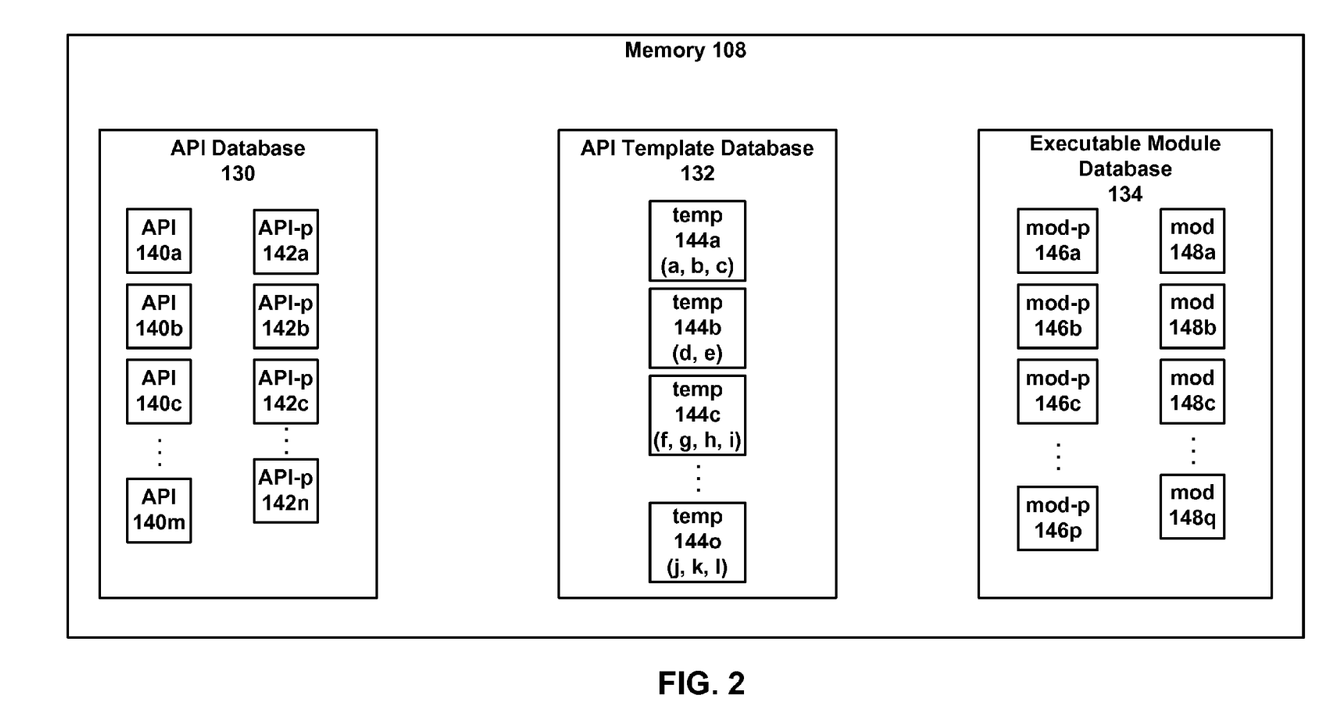
FIG. 2 illustrates API database configurations according to an embodiment.

FIG. 2 illustrates an example API database 130, template database 132 and executable module database 134. In an embodiment, API database 130 includes first APIs 140 (including API 140a-API 140m), and second APIs 142 (including API-p 142a-API-p 142n). First APIs 140 and second APIs 142 are each published on API gateway 112. In an embodiment, first APIs 140 are created by a user of API gateway 112 using gateway user interface 114, and second APIs 142 are created by a user of API developer portal 120a using portal user interface 122a.

In an embodiment, API template database 132 includes API templates 144 (including temp 144a-temp 144o). In an embodiment, API templates 144 are created by a user of API gateway 112 using gateway user interface 114.

In an embodiment, executable module database 134 includes first executable modules 146 (including mod-p 146a-mod-p 146p) and second executable modules 148 (including mod 148a-mod 148q). Each of first executable modules 146 include a flag indicating that the executable module may be published to API developer portal 120a, whereas each of second executable modules 148 do not include the flag, and may not be published to API developer portal 120a. In an embodiment, first executable modules 146 and second executable modules 148 are created by a user of API gateway 112 using gateway user interface 114.

Figure 3A:
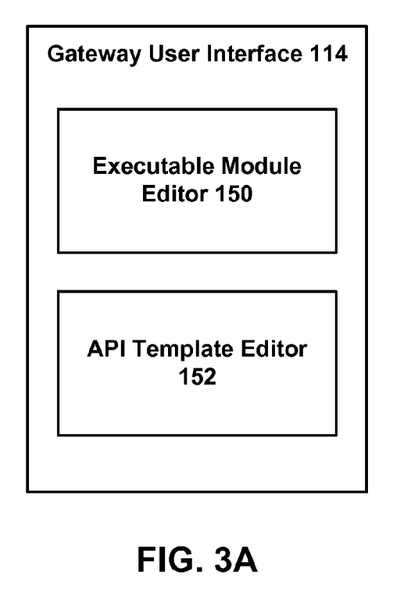
FIG. 3A illustrates a software architecture for a gateway user interface executed on a server computing device according to an embodiment.

FIG. 3A illustrates a software architecture for gateway user interface 114. In an embodiment, gateway user interface 114 includes executable module editor 150 and API template editor 152. Executable module editor 150 allows gateway user 116 to create executable modules, such as first executable modules 146 and second executable modules 148 (FIG. 2), and to specify the branching logic describing the runtime behavior of an API and the variables that may be used to drive the branching logic.

Figure 3B:
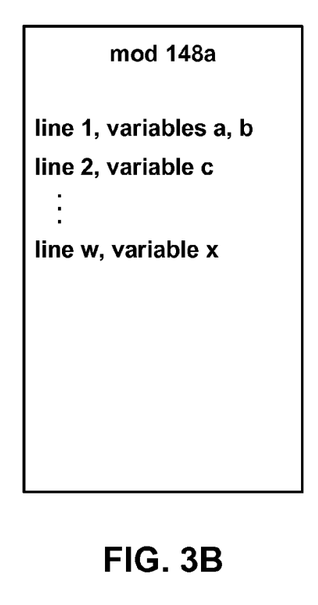
FIGS. 3B-3C illustrate executable modules created using the software architecture of FIG. 3A according to an embodiment.
Figure 3C:
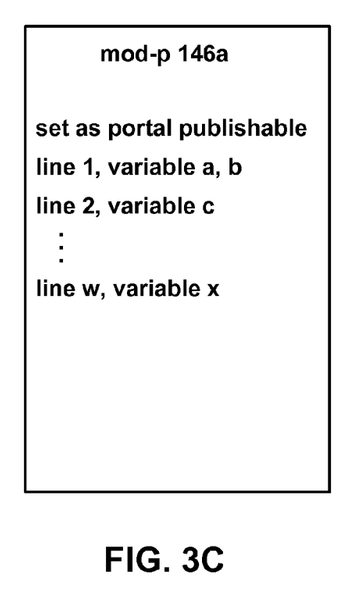

For example, FIGS. 3B-3C illustrate example executable modules mod 148a and mod-p 146a, respectively, that may be created using executable module editor 150. In the illustrated examples, each of executable modules mod 148a and mod-p 146a include w lines that describe the runtime behavior of an API, and each includes variables a, b, c that may be used to drive the branching logic of the executable module. Persons of ordinary skill in the art will understand that executable modules mod 148a and mod-p 146a may include different lines from one another, and may include different variables from one another.

Executable module editor 150 also allows a gateway user 116 to specify that an executable module may be published to API developer portal 120a by including a flag (e.g., "set as portal publishable") in the executable module. For example, executable module mod-p 146a includes the flag "set as portal publishable," and thus executable module mod-p 146a may be published to API developer portal 120a. In contrast, executable module mod 148a does not include the flag, and thus executable module mod 148a may not be published to API developer portal 120a. Persons of ordinary skill in the art will understand that the flag may be included in all executable modules, and may have a first value (e.g., "0," "FALSE") if the executable module may not be publishable to API developer portal 120a, and may have a second value (e.g., "1," "TRUE") if the executable module may be publishable to API developer portal 120a.

Thus, gateway user 116 may use executable module editor 150 to control which executable modules may be published to API developer portal 120a by either including or not including the flag in the executable module. In the example illustrated in FIG. 2, first executable modules mod-p 146a-mod-p 146p each include a flag indicating that the executable module may be published to API developer portal 120a, whereas each of second executable modules mod 148a-mod 148q do not include the flag, and may not be published to API developer portal 120a.

Referring again to FIG. 3A, API template editor 152 allows gateway user 116 to create API templates, such as API templates temp 144a-temp 144o (FIG. 2), link the created API template to one of first executable modules mod-p 146a-mod-p 146, and specify the variables of the linked executable module that may be configured using API developer portal 120a.

Figure 4:
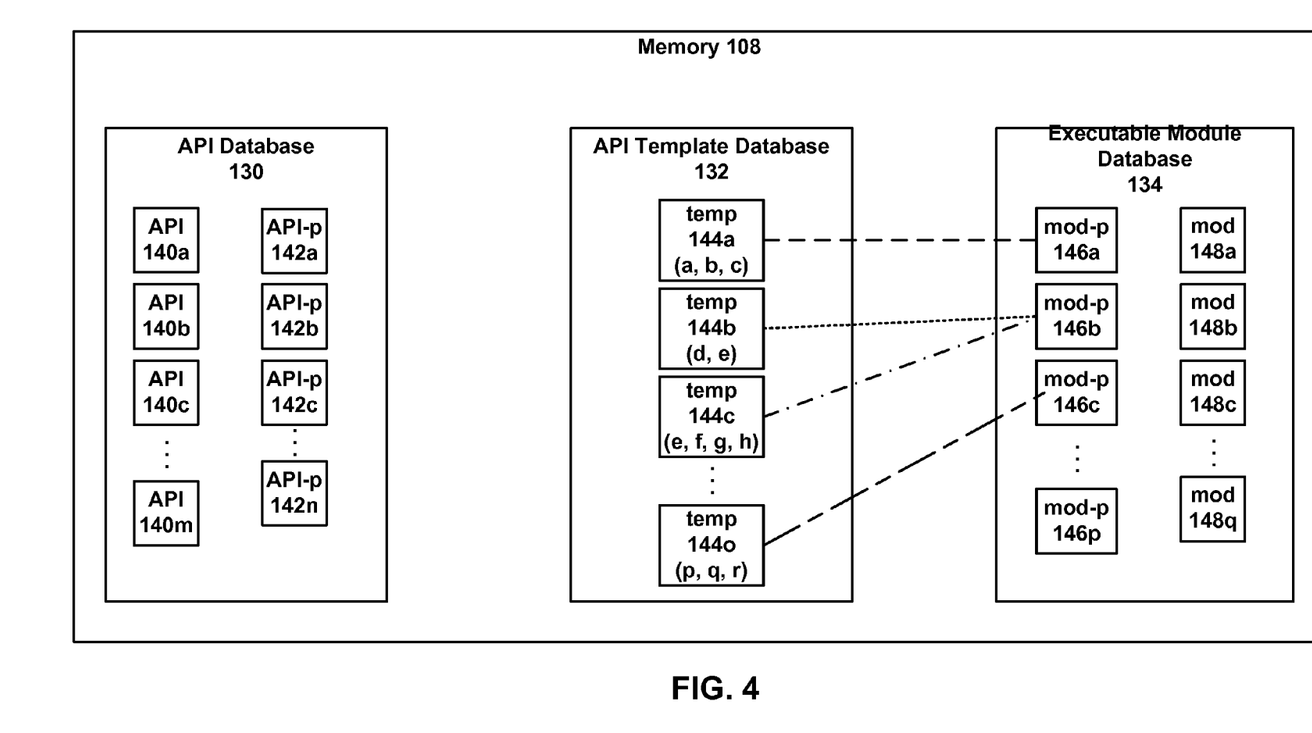
FIG. 4 illustrates API database configurations and relationships according to an embodiment.

For example, FIG. 4 illustrates API templates temp 144a-temp 144o, with each API template linked to one of first executable modules mod-p 146a-mod p 146c. In particular, API template temp 144a is linked to executable module mod-p 146a, and specifies that variables (a, b, c) are configurable on API developer portal 120a. Similarly, API template temp 144b is linked to executable module mod-p 146b, and specifies that variables (d, e) are configurable on API developer portal 120a. API template temp 144c is also linked to executable module mod-p 146b, but specifies that variables (e, f, g, h) are configurable on API developer portal 120a. Likewise, API template temp 144o is linked to executable module mod-p 146c, and specifies that variables (p, q, r) are configurable on API developer portal 120a. Thus, gateway user 116 may use API template editor 152 to create API templates that are linked to specific published executable modules, and specify the variables of the published executable modules that may be configured on API developer portal 120a.

In an embodiment, API template editor 152 may restrict the argument types of the variables of the linked executable modules that may be configured using API developer portal 120a. For example, API template editor 152 may restrict configurable variables to string, integer, decimal and Boolean argument types, and may omit any other argument type.

Figure 5A:
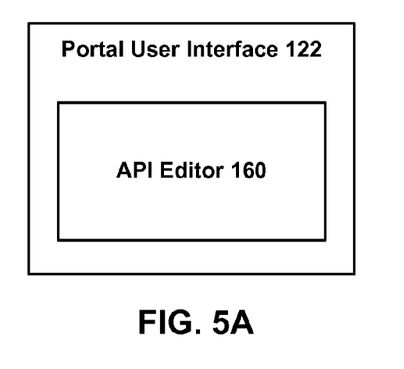
FIG. 5A illustrates a software architecture for an API developer portal user interface executed on a client computing device according to an embodiment.
Figure 5B:
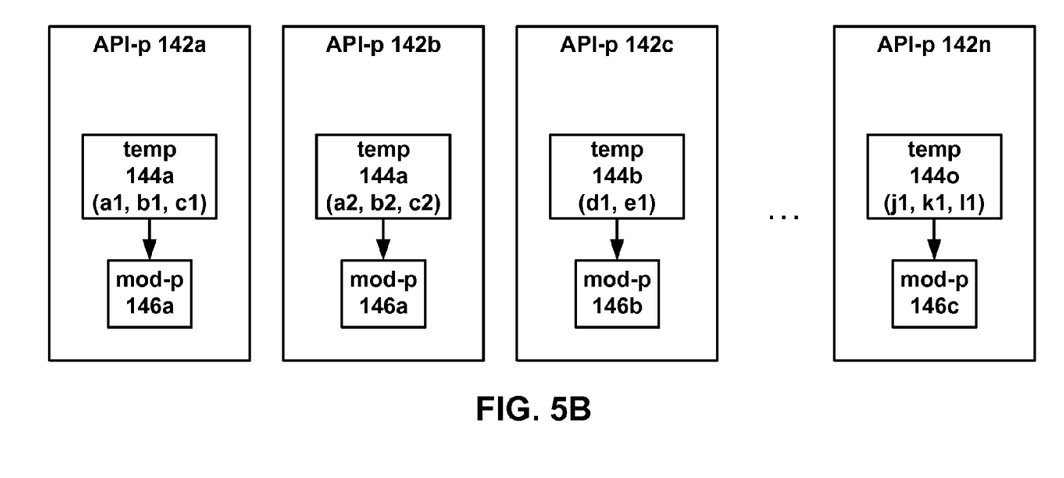
FIG. 5B illustrates API templates created using the software architecture of FIG. 5A according to an embodiment.

FIG. 5A illustrates a software architecture for portal user interface 122a. In an embodiment, portal user interface 122a includes API editor 160 which allows a portal user (e.g., portal user 124) to create and publish APIs on API gateway 112. For example, API editor 160 allows portal user 124 to create an API by selecting one of API templates temp 144a-temp 144o, configuring the variables specified in the selected API template, and then saving the configured API template as an API on API gateway 112. For example, FIG. 5B illustrates second APIs API-p 142a-API-p 142-n created using API editor 160. Each of second APIs API-p 142a-API-p 142-n includes one of API templates temp 144a-temp 144o, and includes values for the configured variables specified in the API template.

Figure 6:
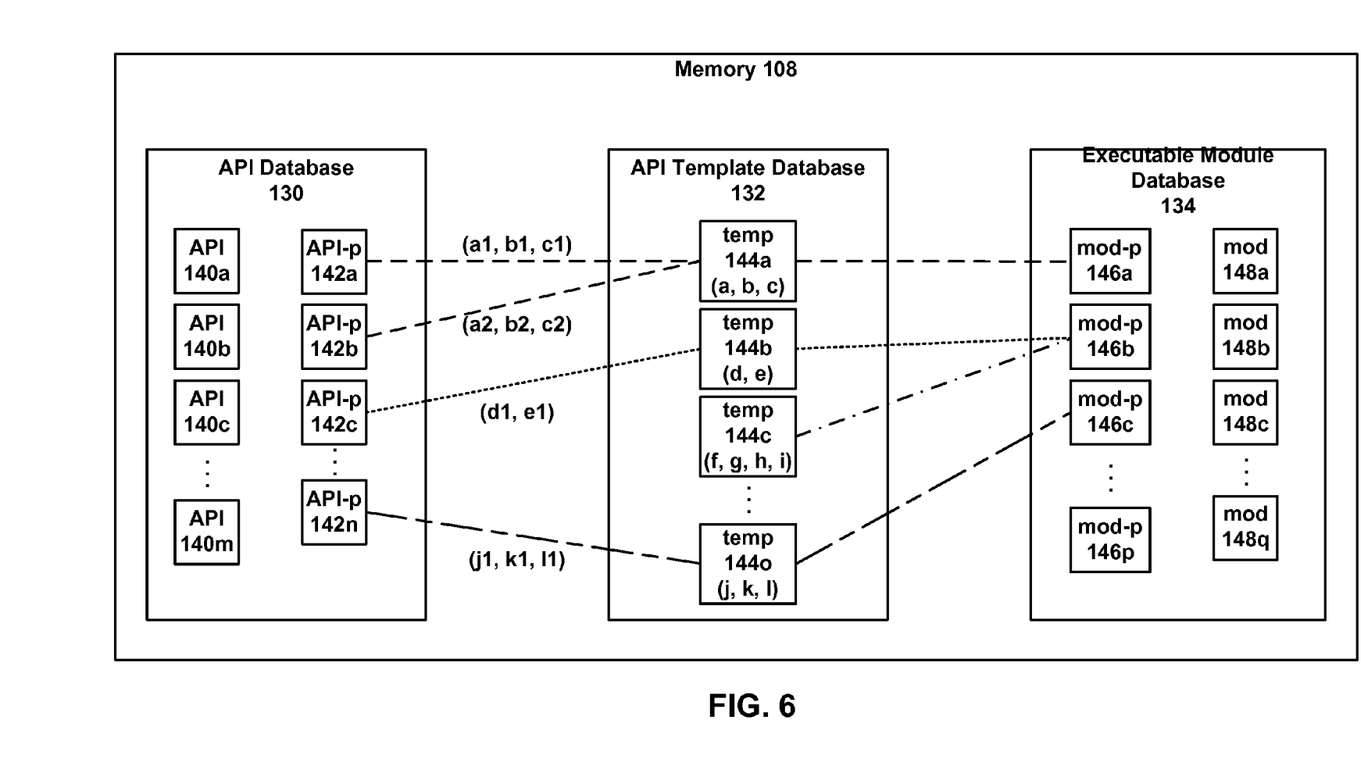
FIG. 6 illustrates API database configurations and relationships according to an embodiment.

For example, API-p 142a includes API template temp 144a, which is linked to executable module mod-p 146a, and includes values (a1, b1, c1) configured for the template variables (a, b, c). API-p 142b also includes API template temp 144a, which is linked to executable module mod-p 146a, but includes values (a2, b2, c2) configured for the template variables (a, b, c). API-p 142c includes API template temp 144b, which is linked to executable module mod-p 146b, and includes values (d1, e1) configured for the template variables (d, e). Likewise, API-p 142n includes API template temp 144o, which is linked to executable module mod-p 146c, and includes values (j1, k1, l1) configured for the template variables (j, k, l). FIG. 6 illustrates the relationships and configuration values of the example second APIs API-p 142a-API-p 142-n, API templates temp 144a-temp 144o, and first executable modules mod-p 146a-mod-p 146 described above.

Figure 7:
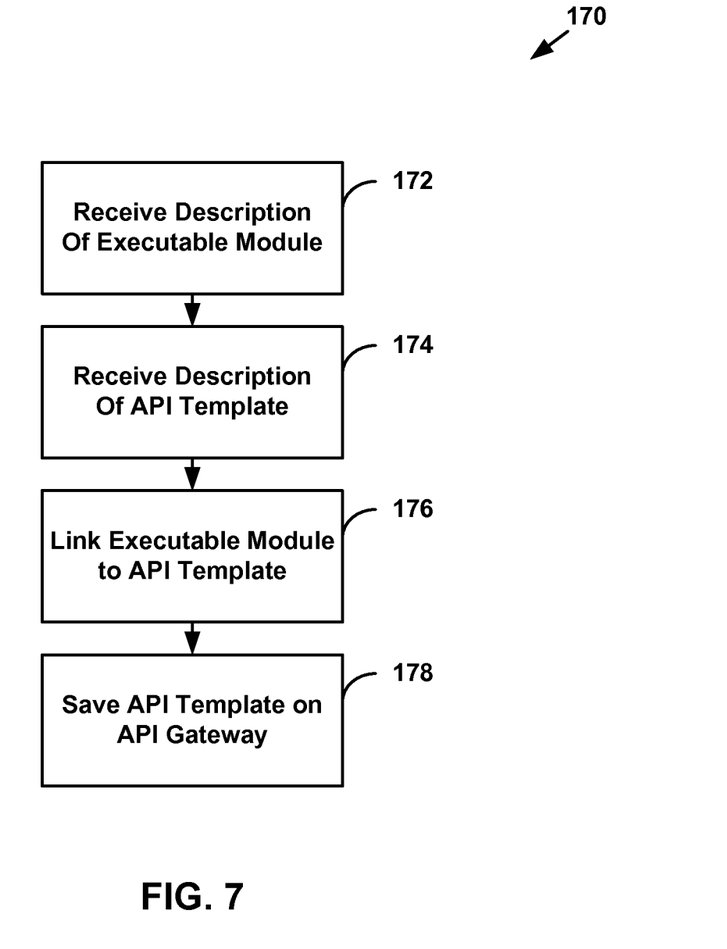
FIG. 7 is a flowchart illustrating a protocol for creating a publishable executable module and an API template with a server computer processing device according to an embodiment.
Figure 8:
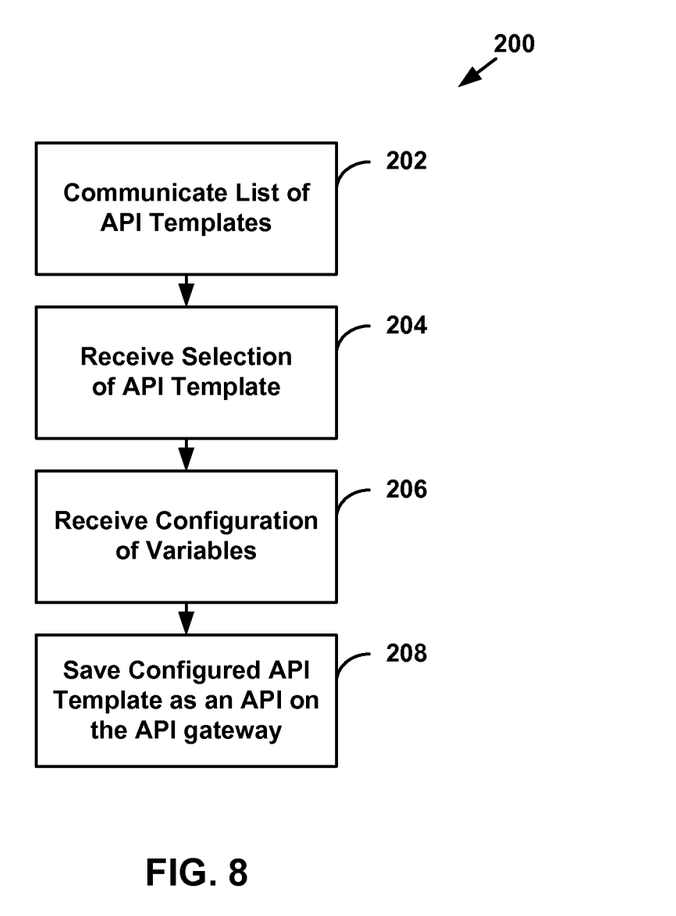
FIG. 8 is a flowchart illustrating a protocol for creating an API with a client computer processing device according to an embodiment.

Referring again to FIG. 1, in an embodiment, user 116 uses gateway user interface 114 to create an executable module (e.g., mod-p 146a) and an API template (e.g., temp 144a) on API gateway 112 that is linked to the executable module, and that specifies the executable module variables (e.g., a, b, c) that may be configured on API developer portal 120a. User 124 uses API developer portal 120a to select the API template (e.g., temp 144a), configure the variables specified by the API template (e.g., a1, b1, c1), and save the configured API template as an API on API gateway 112. FIGS. 7 and 8, described in more detail below, illustrate protocols or methods for creating an executable module and an API template, and for creating and publishing an API on API gateway 112 using the created template.

FIG. 7 is a flowchart illustrating a protocol or method 170 for creating an executable module, such as executable module mod-p 146a, and an API template, such as API template temp 144a, using API gateway 112, according to an embodiment.

Logic block 172 illustrates receiving from gateway user 116 a description of the branching logic describing the runtime behavior of an API, the variables that may be used to drive the branching logic, and an instruction to include a flag (e.g., "set as portal publishable") indicating the executable module should be published to API developer portal 120a. In an embodiment, executable module editor 150 of gateway user interface 114 receives the description and instruction from gateway user 116, and saves the executable module (e.g., mod-p 146a) in executable module database 134.

Logic block 174 illustrates receiving from gateway user 116 a description of an API template (e.g., temp 144*a*), including a selection of the executable module (e.g., mod-p 146*a*) to link to the API template, and a specification of variables (e.g., (a, b, c)) of the linked executable module that may be configured on API developer portal 120*a*. In an embodiment, API template editor 152 of gateway user interface 114 receives the API template description.

Logic block 176 illustrates linking the executable module (e.g., mod-p 146*a*) to the API template (e.g., temp 144*a*), and including the specification of the variables (e.g., (a, b, c)) of the linked executable module that may be configured on API developer portal 120*a*. In an embodiment, API template editor 152 of gateway user interface 114 links the selected executable module to the API template and includes the specification of variables in the API template.

Logic block 178 illustrates saving the API template (e.g., temp 144*a*) on API gateway 112. In an embodiment, API template editor 152 of gateway user interface 114 saves the API template in API template database 132.

FIG. 8 is a flowchart illustrating a protocol or method 200 for creating and publishing an API on API gateway 112 using API developer portal 120*a*, according to an embodiment.

Logic block 202 illustrates communicating a list of API templates to a portal user (e.g., portal user 124 or portal user 126). In an embodiment, API editor 160 of portal user interface 122*a* queries API gateway 112 for a list of API templates, such as API templates temp 144*a*-temp 144*o*, and displays the received list to the portal user. In some embodiments, the particular API templates that are displayed may depend on the user using portal user interface 122*a*. For example, API editor 160 may display a first list of API templates to portal user 124, and may display a different list of API templates to portal user 126. In this regard, API editor 160 may limit access of API templates to particular portal users.

Logic block 204 illustrates receiving from a portal user (e.g., portal user 124) a selection of one of the displayed API templates (e.g., temp 144*a*). In an embodiment, API editor 160 of portal user interface 122*a* receives the user selection.

Logic block 206 illustrates receiving from a portal user (e.g., portal user 124) specified values of the configurable variables specified in the selected API template. In an embodiment, API editor 160 of portal user interface 122*a* displays a list of the configurable variables specified in the selected API template, and prompts the portal user to specify values of the displayed configurable variables. For example, if the portal user selected API template temp 144*a*, the specified variables (a, b, c) are displayed, and the portal user is prompted to specify values of variables (e.g., (a1, b1, c1)). In an embodiment, API editor 160 of portal user interface 122*a* receives the user specification.

Logic block 208 illustrates saving the configured API template (e.g., temp 144*a*) as an API (e.g., API-p 142*a*) on API gateway 112. In an embodiment, API editor 160 of portal user interface 122*a* communicates the configured API template to API gateway 112, which saves the template in API database 130 and publishes the API.

Figure 9:
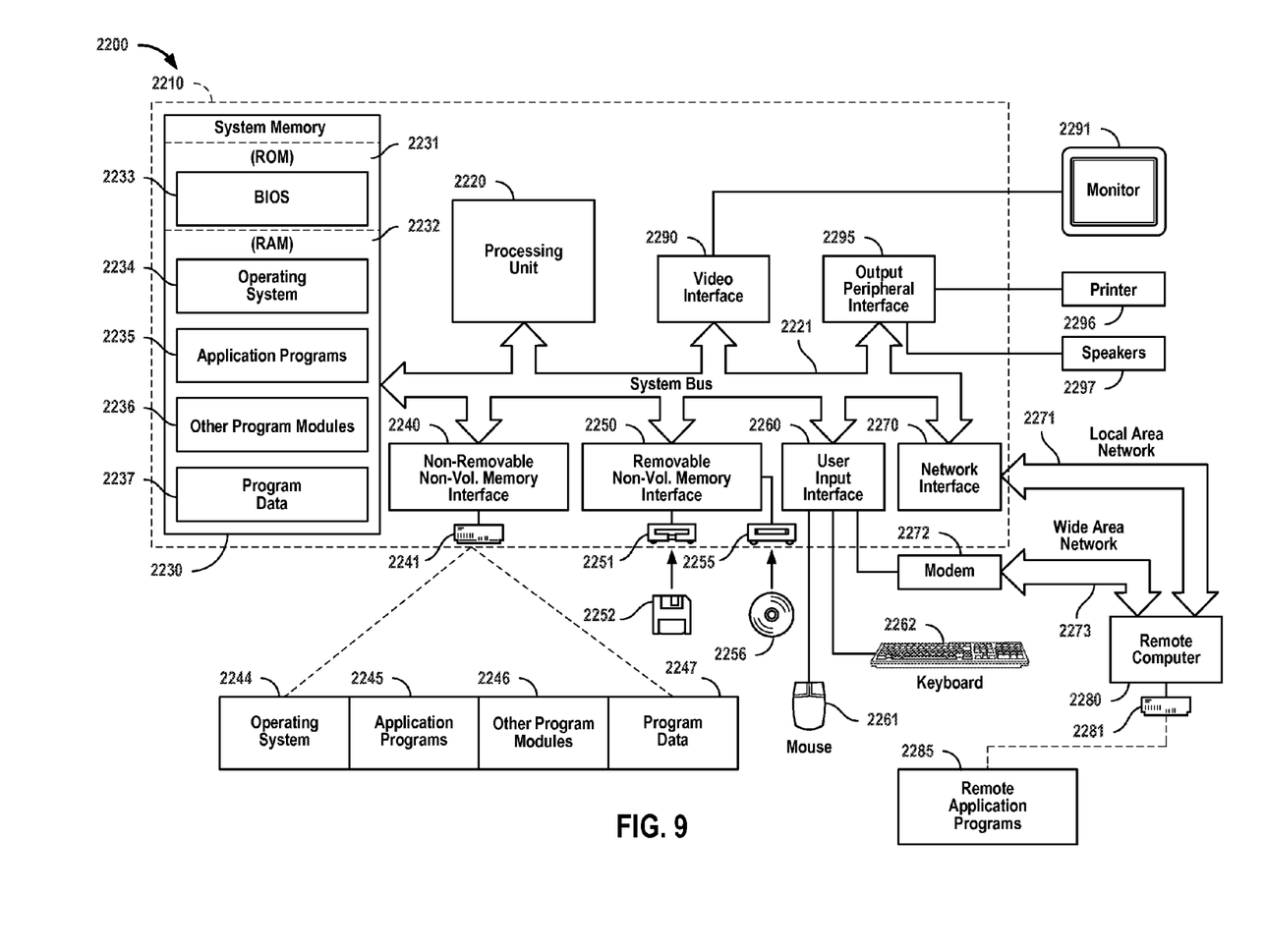
FIG. 9 is a block diagram of a computing device environment according to an embodiment.

The disclosed technology may be used with various computing systems or computing devices. FIG. 9 is a block diagram of an embodiment of a system environment 2200. Computing system environment 2200 includes a general purpose computing device in the form of a computer 2210. In an embodiment, second computing device 106 shown in FIG. 1 corresponds to computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237. In an embodiment, computer program code as described herein may be at least partially stored in application programs 2235.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. In an embodiment, API developer portals 120a and 120b shown FIG. 1 each corresponds to application programs 2245 and portal user interfaces 122a and 122b shown in FIG. 1 each corresponds to operating system 2244. In an embodiment, portal user interface 122a and portal user interface 122b are natural language interfaces and/or touch surfaces for user speech, touch or gesture input and output.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. In an embodiment, first computing device 102 shown in FIG. 1 corresponds to remote computer 2280. Similarly, API gateway 112 may be stored and/or executed in remote computer 2280 in an embodiment. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. In an embodiment API gateway 112 shown in FIG. 1 corresponds to remote application programs 2285. It will be appreciated that the network connections shown are exemplary and other means of establishing a communications link between the computers may be used.

The flowchart and block diagrams in the figures illustrate the architecture, functionality, and operation of possible implementations of systems, methods and computer program products according to various aspects of the present disclosure. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for creating an application program interface (API), the method comprising:
creating on a server computing device a plurality of executable modules, each executable module comprising a first variable and a flag comprising a first predetermined value if the executable module may be published to a client computing device, and a second predetermined value if the executable module may not be published to the client computing device;
creating on the server computing device a first template comprising a selection of one of the executable modules comprising the flag comprising the first predetermined value and a specification of the first variable;
linking the one executable module to the first template; and
communicating information about the first template from the server computing device to the client computing device;
receiving on the client computing device a selection of the first template;
receiving on the client computing device a configuration of the specified first variable; and
saving the selected first template and the configured first variable as the API on the server computing device.

2. The method of claim 1, wherein the flag comprises a text string.

3. The method of claim 1, wherein the one executable module includes branching logic describing runtime behavior of the API.

4. The method of claim 3, wherein the first variable drives the branching logic.

5. The method of claim 1, wherein the first variable comprises a text string, an integer value, a decimal value or a Boolean value.

6. The method of claim 1, wherein:
the one executable module comprises a plurality of first variables; and
the first template comprises a specification of a subset of the first variables.

7. The method of claim 6, further comprising receiving a configuration of the specified first variables on the client computing device.

8. The method of claim 1, wherein the one executable module further comprises a second variable, and the method further comprises:
receiving a description of a second template on the server computing device, the description comprising a selection of the one executable module and a specification of the second variable.

9. The method of claim 1, further comprising creating an application that uses the API to access resources on the server computing device.

10. A system comprising:
a first apparatus comprising a first processor and a second apparatus comprising a second processor; and
a computer readable storage medium to store a first application having computer readable program code and a second application having computer readable program code,
wherein the first processor executes the computer readable program code of the first application to:
create on a server computing device a plurality of executable modules, each executable module comprising a first variable and a flag comprising a first predetermined value if the executable module may be published to a client computing device, and a second predetermined value if the executable module may not be published to the client computing device;
create on the server computing device a first template comprising a selection of one of the executable modules comprising the flag comprising the first predetermined value and a specification of the first variable;
link the one executable module to the first template; and
communicate information about the first template from the server computing device to the client computing device;
wherein the second processor executes the computer readable program code of the second application to:
receive on the client computing device a selection of the first template;
receive on the client computing device a configuration of the specified first variable; and
save the selected template and the configured first variable as an application program interface (API) on the server computing device.

11. The system of claim 10, wherein the flag comprises a text string.

12. The system of claim 10, wherein the one executable module includes branching logic describing runtime behavior of the API.

13. The system of claim 10, wherein the first variable drives the branching logic.

14. The system of claim 10, wherein the first apparatus comprises the server computing device, comprising an API gateway.

15. The system of claim 10, wherein the second apparatus comprises the client computing device, comprising an API developer portal.

16. A computer program product comprising:
a non transitory computer readable storage medium having computer readable program code embodied therewith, the computer readable program code comprising:
computer readable program code configured to create on a server computing device a plurality of executable modules, each executable module comprising a first variable and a flag comprising a first predetermined value if the executable module may be published to a client computing device, and a second predetermined value if the executable module may not be published to the client computing device;
computer readable program code configured to create on the server computing device a first template comprising a selection of one of the executable modules comprising the flag comprising the first predetermined value and a specification of the first variable;
computer readable program code configured to link the one executable module to the first template;
computer readable program code configured to communicate information about the first template from the server computing device to the client computing device;
computer readable program code configured to receive on the client computing device a selection of the first template;
computer readable program code configured to receive on the client computing device a configuration of the specified first variable; and
computer readable program code configured to save the selected first template and the configured first variable as an application program interface (API) on the server computing device.

17. The computer program product of claim 16, wherein the flag comprises a text string.

18. The computer program product of claim 16, wherein the one executable module includes branching logic describing runtime behavior of the API.

19. The computer program product of claim 16, wherein the first variable drives the branching logic.

20. The computer program product of claim 16, wherein:
the one executable module comprises a plurality of first variables;
the first template comprises a specification of a subset of the first variables; and
the computer readable program code further comprises computer readable program code on the client computing device configured to receive a configuration of the specified first variables on the client computing device.

21. The computer program product of claim 16, wherein:
the one executable module further comprises a second variable; and
the computer readable program code further comprises computer readable program code on the server configured to receive a description of a second template, the description comprising a selection of the executable module and a specification of the second variable.

* * * * *